United States Patent
Kärkkäinen et al.

(10) Patent No.: US 11,070,531 B2
(45) Date of Patent: Jul. 20, 2021

(54) DATA COMMUNICATION SYSTEM AND METHOD

(71) Applicant: Gurulogic Microsystems Oy, Turku (FI)

(72) Inventors: Tuomas Kärkkäinen, Turku (FI); Mikko Sahlbom, Perniö (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

(21) Appl. No.: 16/628,863

(22) PCT Filed: Jul. 6, 2018

(86) PCT No.: PCT/EP2018/068335
§ 371 (c)(1),
(2) Date: Jan. 6, 2020

(87) PCT Pub. No.: WO2019/008130
PCT Pub. Date: Jan. 10, 2019

(65) Prior Publication Data
US 2020/0236088 A1    Jul. 23, 2020

(30) Foreign Application Priority Data
Jul. 7, 2017   (GB) ..................... 1711016

(51) Int. Cl.
*H04L 29/06* (2006.01)
*H04W 12/04* (2021.01)
(Continued)

(52) U.S. Cl.
CPC ........ *H04L 63/0428* (2013.01); *H04L 9/0894* (2013.01); *H04L 63/065* (2013.01);
(Continued)

(58) Field of Classification Search
CPC ............. H04L 63/0428; H04L 9/0894; H04W 12/0401
See application file for complete search history.

(56) References Cited

U.S. PATENT DOCUMENTS 6,625,734 B1 * 9/2003 Marvit .................... H04L 51/34
380/277
7,096,355 B1   8/2006 Marvit et al.
(Continued)

FOREIGN PATENT DOCUMENTS

CN   102065021 A   5/2011
CN   102884535 A   1/2013
(Continued)

OTHER PUBLICATIONS

GB Intellectual Property Office, Combined Search and Examination Report under Sections 17 and 18(3), Application No. 1711016.4, dated Dec. 14, 2017, 7 pages.
(Continued)

*Primary Examiner* — Jason Chiang
(74) *Attorney, Agent, or Firm* — Ziegler IP Law Group, LLC (57) ABSTRACT

A data communication system for a local network. The system includes a network node and a plurality of network devices associated therewith. The network node provides a network node service to clients or bots executing on the plurality of network devices. Individual clients or bots are communicably and only programmatically coupled around the network node service in a programmatic star configuration to create the local network. The network node service validates and authenticates local services provided by the clients or bots within the local network. Data is communicated between clients or bots within the local network in real time or near real time, by relaying the data through the network node service. Information content of the data is (Continued)

encrypted prior to communicating the data, by employing a key store associated with a user of the source client or bot.

15 Claims, 5 Drawing Sheets

(51) Int. Cl.
    *H04L 9/08*         (2006.01)
    *H04L 29/08*       (2006.01)
    *H04W 12/06*      (2021.01)
    *H04W 12/041*     (2021.01)

(52) U.S. Cl.
    CPC .............. *H04L 63/08* (2013.01); *H04L 67/10* (2013.01); *H04W 12/041* (2021.01); *H04W 12/06* (2013.01); *H04L 2209/60* (2013.01)

(56) References Cited

U.S. PATENT DOCUMENTS

| | | | |
|---|---|---|---|
| 2001/0013069 A1* | 8/2001 | Shah | H04L 51/28 709/238 |
| 2002/0062385 A1* | 5/2002 | Dowling | G06Q 20/32 709/230 |
| 2003/0130969 A1* | 7/2003 | Hawkins | H04L 41/0659 706/15 |
| 2007/0189539 A1* | 8/2007 | Kim | H04L 9/0822 380/277 |
| 2007/0282996 A1* | 12/2007 | Chaki | H04L 67/24 709/223 |
| 2009/0122984 A1 | 5/2009 | Fascenda et al. | |
| 2010/0031063 A1 | 2/2010 | Fascenda et al. | |
| 2010/0037311 A1* | 2/2010 | He | H04L 63/0209 726/15 |
| 2010/0061316 A1* | 3/2010 | Levenshteyn | H04L 29/06027 370/329 |
| 2012/0042390 A1 | 2/2012 | Iwuchukwu | |
| 2013/0195272 A1 | 8/2013 | Nagai et al. | |
| 2014/0123221 A1 | 5/2014 | Farina et al. | |
| 2015/0052361 A1* | 2/2015 | Winkler-Teufel | H04L 63/0428 713/171 |
| 2015/0150124 A1 | 5/2015 | Zhang et al. | |
| 2015/0293756 A1* | 10/2015 | Wright | G06F 21/577 717/178 |
| 2016/0065548 A1 | 3/2016 | Brouwer et al. | |
| 2017/0195318 A1 | 7/2017 | Liu et al. | |
| 2017/0299633 A1* | 10/2017 | Pietrowicz | H04L 67/12 |
| 2018/0212833 A1* | 7/2018 | Bharti | H04L 41/12 |

FOREIGN PATENT DOCUMENTS

| | | |
|---|---|---|
| CN | 105743930 A | 7/2016 |
| RU | 2418369 C2 | 5/2011 |

OTHER PUBLICATIONS

GB Intellectual Property Office, Patents Act 1977: Examination Report under Section 18(3), Application No. 1711016.4 dated Dec. 5, 2019, 3 pages.
International Preliminary Examining Authority, Notification of Transmittal of the International Preliminary Report on Patentability, Application No. PCT/EP2018/068335, dated May 28, 2019, 26 pages.
International Search Report, Application No. PCT/EP2018/068335, dated Oct. 4, 2018, 3 pages.
China Patent Office, Office Action. Application No. 201880038400.8, dated Jun. 2, 2020, 5 pages.
Federal Service for Intellectual Property (Rospatent), Patent Search Report, Application No. 2019143002128, Date of completion Jun. 18, 2020, 2 pages.
Korean Patent Office, Notice of Allowance, Application No. 10-2020-7003108, dated Jul. 16, 2020, 5 pages.
Patent Office of the Russian Federation, Office Action (Enquiry), Application No. 2019143002/08(083571), dated Jun. 22, 2020, 3 pages.
Patent Office of the Russian Federation, Notice of Allowance, Application No. 2019143002/28, dated Sep. 23, 2020, 12 pages, English Translation enclosed, 2 pages.
China Patent Office, Notice of Allowance, Application No. 201880038400.8, dated Nov. 27, 2020, 4 pages.

* cited by examiner

DATA COMMUNICATION SYSTEM AND METHOD

TECHNICAL FIELD

The present disclosure relates to data communication systems. Moreover, the present disclosure is concerned with methods of communicating data. Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods.

BACKGROUND

Contemporary home and office data communication networks are based upon connected devices in a physically open local network, wherein a given device can communicate with other devices and service providers outside its open local network. Data communication between two physically-connected devices (namely, node-to-node data transfer) is facilitated by a data link layer (OSI L2), which provides a link between the two physically-connected devices. In this regard, the data link layer (OSI L2) defines a protocol to establish and terminate the connection between the two physically-connected devices.

Data services provided via such open local networks are often exposed to on-going attacks, eavesdropping, and other unwanted activities of abuse. A typical contemporary approach is to protect the devices using firewall and antivirus scanners. However, such an approach is not capable of protecting the devices against attacks made from inside the open local network.

Another contemporary approach is to provide an encrypted connection for data transmission between a given user device and a given server. However, information to be transmitted is encrypted only during transmission, and is stored in unencrypted form at both the endpoints, namely the given user device and the given server. As a consequence, the information is not safeguarded from possible abuses.

Moreover, contemporary services are generated by a service provider's data centres. Such contemporary practices suffer from several disadvantages. Firstly, it is a well-known fact that contemporary data centres consume more energy for cooling than all airlines in the world together, as they remain idle most of the time. Secondly, contemporary data centres make information produced and used by a given user available to service providers for various purposes, for example, such as for targeted advertising based upon user profiling, namely selling such information to third parties for commercial use.

Furthermore, contemporary search engine services base their existence upon open and accessible information present on the Internet®, and their services create a foundation of a contemporary information society. These search engine services wield great power, and it is possible that information accessible to the search engine services is misused for various purposes, which is not desirable for individual user protection, companies or even in respect of legislation from different countries.

In a published US patent application US 2016/0065548 A1 ("Keychain syncing"; inventors: Michael Brouwer, Dallas B. De Atley and Mitchell D. Adler), there is described a program that when executed by at least one processing unit of a device synchronizes a set of keychains stored on the device with a set of other devices. The device and the set of other devices are communicatively coupled to one another through a peer-to-peer (P2P) network. The program receives a modification to a keychain in the set of keychains stored on the device. The program generates an update request for each device in the set of other devices in order to synchronize the set of keychains stored on the device with the set of other devices. The program transmits through the P2P network a set of update requests to the set of other devices over a set of separate, secure communication channels.

In another published US patent application US 2013/0195272 A1 ("Base station apparatus for transmitting or receiving a signal containing predetermined information"; inventors: Makoto Nagai and Yoshihiro Hori), there is described a storage unit, which stores a symmetric key table that indicates a plurality of kinds of symmetric keys usable for communications between terminal apparatuses. A MAC frame processing unit receives a packet broadcast from a terminal apparatus. A verification unit verifies a version of the symmetric key table containing a symmetric key by which to generate a digital signature appended to the received packet. A detector detects whether or not the version of the symmetric key table that has been verified is older than the version of the symmetric key table stored in the storage unit. When the number of detections is a predetermined number or above in a unit time, the MAC frame processing unit generates a packet that includes the symmetric key table stored in the storage unit. The MAC frame processing unit then broadcasts the generated packet.

In yet another published US patent application US 2010/0031063 A1 ("System for and Method of Remote Secure Backup"; inventors: Anthony Fascenda, Emil Sturniolo, Robert Cichielo and Paul Benware), there is described a method of securely registering a module for backup, wherein the module comprises at least one nonvolatile memory and a processor. The method comprises provisioning a module, generating a backup key for the module, encrypting the backup key using an export key, transmitting the encrypted backup key and other information to a backup center and storing the encrypted backup key and the other information with the backup center.

In still another published US patent application US 2009/0122984 A1 ("Secure mobile telephony"; inventors: Anthony Fascenda, Emil Sturniolo, Robert Cichielo and Paul Benware), there is described a system and method for providing end-to-end encrypted real-time phone calls using a commodity mobile phone and without requiring service provider cooperation. The system and method omit any requirement for mobile phones that are specially manufactured to include end-to-end encryption functionality.

In yet another published U.S. Pat. No. 7,096,355 B1 ("Dynamic encoding algorithms and inline message decryption"; inventors: Maclen Marvit, Keith David Rosema, Jeffrey Ubois, David Marvit, Dean Brettle, Yair Zadik and Stuart Goodnick), there is described an inline message decryption approach, in which an encoded message is provided to a user in a form that enables the user's client to process the encoded message using conventional client tools and obtain a cleartext message. This eliminates the need for the user's client to be aware of a particular encoding algorithm used to encode the message. The inline message decryption approach includes: a) in-situ decryption; b) remote decryption; and c) data uploading. An approach is also provided for exchanging data between nodes in a network using sets of associated URLs.

In a published United States patent document US 2017/0195318 A1 (Afero, Inc.; "System and Method for Automatic Wireless Network Authentication in an Internet Of Things (IoT) System"), there is described a system, apparatus, and method for a secure IoT wireless network configuration. An Internet of Things (IoT) hub comprises a local wireless communication interface to establish local wireless connections with one or more IoT devices and/or IoT extender hubs. Moreover, the Internet of Things (IoT) hub also comprises a network router to establish network connections over internet on behalf of the IoT devices and/or IoT extender hubs. Furthermore, the Internet of Things (IoT) hub comprises an authentication module to receive a connection requests from the IoT devices and/or an IoT extender hubs and to grant the connection requests when the IoT devices and/or IoT extender hubs use proper authentication.

In a published United States patent document US 2012/0042390 A1 (Nokia Corporation; "Method and Apparatus for Secure Revocable Location Sharing"), there are described techniques for a secure revocable location sharing network service include determining a first identifier for a subscriber at a first service. In operation, a location access key stored at a second service in association with a second identifier for the subscriber is determined. Furthermore, at least one ciphered location is determined based on the location access key and at least one location associated with the subscriber. Another technique includes associating a subscriber with an access key and an identifier at a first service for contacts.

In light of the foregoing, there arises a contemporary need for a data communication system that is more safe, ecological and affordable as compared to conventional data centres.

SUMMARY

The present disclosure seeks to provide an improved data communication system.

Moreover, the present disclosure seeks to provide an improved method of communicating data.

A further aim of the present disclosure is to at least partially overcome at least some of the problems of the prior art, as described in the foregoing.

In a first aspect, embodiments of the present disclosure provide a data communication system for a local network, the data communication system comprising at least one network node and a plurality of network devices associated with the at least one network node, characterized in that:
  the at least one network node is configured to provide a network node service to a plurality of clients or bots executing on the plurality of network devices, wherein individual clients or bots of the plurality of clients or bots are communicably and only programmatically coupled around the network node service in a programmatic star configuration to create the local network, further wherein the network node service is configured to validate and authenticate local services provided by the plurality of clients or bots within the local network;
  a source client or bot is configured to communicate data together with metadata to one or more destination clients or bots within the local network in real time or near real time, by relaying the data through the network node service; and
  the source client or bot is configured to encrypt information content of the data prior to communicating the data to the one or more destination clients or bots, wherein the source client or bot is configured to employ a key store to encrypt the information content of the data, the key store being associated with a user of the source client or bot, wherein the metadata comprises:
  encryption information indicative of a unique identifier (ID) of the key store and a key index of a key material to be derived from the key store for subsequent decryption of the encrypted information content of the data, and
  group information indicative of the one or more destination clients or bots to which the data is to be communicated, wherein the source client or bot and the one or more destination clients or bots together form a group.

Embodiments of the present disclosure are of advantage in that the data communication system enables users to produce services for their own use by using clients or bots executing on efficiently integrated local network devices in local networks, whilst protecting data produced by the services in respect of the users of the clients or bots.

In a second aspect, embodiments of the present disclosure provide a method of communicating data, via a data communication system for a local network, the data communication system comprising at least one network node and a plurality of network devices associated with the at least one network node, characterized in that the method comprises:
  providing, via the at least one network node, a network node service to a plurality of clients or bots executing on the plurality of network devices, wherein individual clients or bots of the plurality of clients or bots are communicably and only programmatically coupled around the network node service in a programmatic star configuration to create the local network, further wherein the network node service is configured to validate and authenticate local services provided by the plurality of clients or bots within the local network;
  communicating data together with metadata from a source client or bot to one or more destination clients or bots within the local network in real time or near real time, by relaying the data through the network node service; and
  encrypting, at the source client or bot, information content of the data prior to communicating the data to the one or more destination clients or bots, wherein a key store is employed to encrypt the information content of the data, the key store being associated with a user of the source client or bot,
wherein the metadata comprises:
  encryption information indicative of a unique identifier (ID) of the key store and a key index of a key material to be derived from the key store for subsequent decryption of the encrypted information content of the data, and
  group information indicative of the one or more destination clients or bots to which the data is to be communicated, wherein the source client or bot and the one or more destination clients or bots together form a group.

In a third aspect, embodiments of the present disclosure provide a computer program product comprising a non-transitory (namely, non-transient) computer-readable storage medium having computer-readable instructions stored thereon, the computer-readable instructions being executable by a computerized device comprising processing hardware to execute the aforementioned method pursuant to the aforementioned second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION OF EMBODIMENTS

In the following detailed description, illustrative embodiments of the present disclosure and ways in which they can be implemented are elucidated. Although some modes of carrying out the present disclosure are described, those skilled in the art would recognize that other embodiments for carrying out or practising the present disclosure are also possible.

In a first aspect, embodiments of the present disclosure provide a data communication system for a local network, the data communication system comprising at least one network node and a plurality of network devices associated with the at least one network node, characterized in that:

the at least one network node is configured to provide a network node service to a plurality of clients or bots executing on the plurality of network devices, wherein individual clients or bots of the plurality of clients or bots are communicably and only programmatically coupled around the network node service in a programmatic star configuration to create the local network, further wherein the network node service is configured to validate and authenticate local services provided by the plurality of clients or bots within the local network;

a source client or bot is configured to communicate data together with metadata to one or more destination clients or bots within the local network in real time or near real time, by relaying the data through the network node service; and the source client or bot is configured to encrypt information content of the data prior to communicating the data to the one or more destination clients or bots, wherein the source client or bot is configured to employ a key store to encrypt the information content of the data, the key store being associated with a user of the source client or bot, wherein the metadata comprises:

encryption information indicative of a unique identifier (ID) of the key store and a key index of a key material to be derived from the key store for subsequent decryption of the encrypted information content of the data, and group information indicative of the one or more destination clients or bots to which the data is to be communicated, wherein the source client or bot and the one or more destination clients or bots together form a group.

Optionally, the at least one network node comprises at least a first network node and a second network node, and the plurality of network devices comprise a first set of network devices associated with the first network node and a second set of network devices associated with the second network node. Optionally, in such a case, the first network node is configured to provide a first network node service to a first set of clients or bots executing on the first set of network devices, while the second network node is configured to provide a second network node service to a second set of clients or bots executing on the second set of network devices. Optionally, in this regard, individual clients or bots of the first set of clients or bots are communicably and only programmatically coupled around the first network node service in a programmatic star configuration to create a first local network, while individual clients or bots of the second set of clients or bots are communicably and only programmatically coupled around the second network node service in a programmatic star configuration to create a second local network, further wherein the first and second network node services are configured to validate and authenticate local services provided by the first and second sets of clients or bots within their respective local networks.

Optionally, when a given source client or bot is configured to communicate data to a given destination client or bot within a same local network, the data to be communicated is relayed in real time or near real time through their associated network node service within the same local network.

Optionally, when a given source client or bot is configured to communicate data to a given destination client or bot from a different local network, the data to be communicated is relayed in real time or near real time through a network node service associated with the given source client or bot and through a network node service associated with the given destination client or bot. As an example, when a source client or bot from the first local network is configured to communicate data to a destination client or bot from the second local network, the data to be communicated is relayed in real time or near real time through the first network node service and the second network node service.

By "real time or near real time", it is meant that in the aforementioned data communication system, the clients or bots can exchange data instantly or with negligible latency. Such latency is vitally important to keep to a minimum in various practical applications of the aforementioned data communication system. As an example, such real time or near real time communication is very beneficial when the aforementioned data communication system is employed for self-drive vehicles and/or for vehicle monitoring purposes, for example, for passenger security in autonomous self-drive vehicles.

It will be appreciated that a given network device may be owned, administered or leased by a given user. Throughout the present disclosure, the term "user" refers to an entity or a group of entities that uses one or more clients or bots executing on one or more network devices, wherein the one or more network devices may be owned, administered or leased by the entity or the group of entities. The term "entity" encompasses both a human user as well as a user device associated with a human user.

Throughout the present disclosure, the terms "client" and "bot" refer to a programmatic module that, when executed on a network device, produces local services for a user of the programmatic module.

Moreover, optionally, the source client or bot is configured to employ at least one key material that is stored in the key store to encrypt the information content of the data.

It will be appreciated that there can be a plurality of key stores associated with the user of the source client or bot, the plurality of the key stores being dedicated for different service providers; in such a case, the unique ID of the key store identifies which key store from amongst the plurality of key stores is to be used for encryption/decryption purposes.

Pursuant to embodiments of the present disclosure, the source client or bot and the one or more destination clients or bots are provided with identical or mutually compatible copies of the key store. Optionally, the key store is provided by any one of the source client or bot or the one or more destination clients or bots. Alternatively, optionally, the key store is provided by a trusted third party. It will be appreciated that no harm arises even if the encrypted information content is accessed by unauthorized parties, because the unauthorized parties do not have access to the relevant key store and its key materials.

Optionally, the key store is implemented by way of a key container or a key generator that is capable of storing key materials and/or generating key materials based upon their key indexes in a reproducible manner. By "reproducible", it means that a same key material is generated from a given key index reproducibly. As an example, the key store can be implemented as described in a UK patent document GB2538052. As another example, the key store can be implemented as described in a UK patent document GB 1620553.6.

Optionally, a plurality of groups are defined within the data communication system in a dynamic manner, wherein a given group of the plurality of groups comprises:
- at least one client or bot from the first local network and
  - at least one client or bot from the second local network, or
- at least two clients or bots from a same local network.

Optionally, each group of the data communication system is assigned a unique group tag. Optionally, in such a case, the group information of the metadata includes a group tag of the group comprising the source client or bot and the one or more destination clients or bots.

It will be appreciated that defining the plurality of groups "in a dynamic manner" means that the groups can vary based upon individual circumstances and requirements, and group structuring can be different at different points of time.

It will also be appreciated that the aforesaid encryption information and the aforesaid group information of the metadata enable the data communication system to perform a fast and reliable data delivery to the destination clients or bots.

Optionally, the metadata is communicated by way of one or more data streams.

According to an embodiment, the metadata is communicated in an unencrypted form. In such a case, a given network node service delivers (namely, relays) the encrypted information content of the data to desired parties, namely the one or more destination clients or bots, based upon the metadata, without a need to process the encrypted information content. In other words, only the information content of the data, which may contain sensitive information, is encrypted; the given network node service does not need to decrypt the encrypted information content and re-encrypt it. As a result, the given network node service does not compromise any sensitive information in respect of the user of the source client or bot. Notably, a given network node providing the given network node service can be implemented in any kind of environment using any kind of device that need not have any security enhancements for protecting the data.

According to another embodiment, the metadata is communicated in an encrypted form. In such a case, it is required that the network node services are implemented to have their own key stores and suitable security modules (namely, clients or bots) associated with the key stores for protecting the key stores from unauthorized access and use, wherein the security modules (namely, the clients or bots) are configured to perform actual encryption and decryption operations. This requires hardware-isolated security features from the network nodes executing the network node services. It will be appreciated that communicating the metadata in the encrypted form is particularly beneficial when it is desired to hide tracking information, so that it would not be possible for an eavesdropping third party to realize what type of data streams are being communicated and with whom the communication is occurring. This potentially enhances cost-efficiency of the data communication system.

However, it will be appreciated that the metadata is not required to be encrypted if there is no reason to hide the tracking information.

Throughout the present disclosure, the term "network node" refers to a physical network node that is configured to provide a network node service, such that the network node service is programmatically centralized to serve clients or bots executing on network devices in its own local network. It will be appreciated that a physical implementation of a local network does not require its network node and network devices to be arranged in a star network topology. In other words, the clients or bots are only programmatically coupled around the network node service in the programmatic star configuration. Throughout the present disclosure, the term "programmatic star configuration" refers to a software topology formed by a network node service and its associated clients or bots.

Moreover, a network node could be implemented either by way of a data communication equipment (for example, such as a modem, hub and the like) or by way of a data terminal equipment (for example, such as a router, a host computer and the like). Optionally, a given network node is implemented by way of a programmatic hub or a programmatic router.

Additionally or alternatively, optionally, a given network node is dynamically implemented by way of a local network device, wherein the local network device is configured to connect and communicate with other local network devices using a programmatically-built star configuration.

Embodiments of the present disclosure are susceptible to being employed in a wide range of systems, wherein the network devices could, for example, be smart telephones, smart watches, Personal Computers (PC's), On-Board Diagnostics (OBD) devices of vehicles, audio-visual apparatus, cameras, television (TV) sets, data storage devices, surveillance cameras, video conferencing equipment, email servers, file systems, media players, medical apparatus, seismic apparatus, surveying apparatus, "black box" flight recorders, or digital musical instruments.

It will be appreciated that a given network node service can be installed at a fixed physical location or a physically moving object. Examples of such moving objects include, but are not limited to, drones, vehicles, smart telephones carried by their users, smart watches carried by their users, and other mobile or wearable devices.

Accordingly, the term "local network" encompasses both physical (namely, static) networks as well as networks implemented in a mobile manner. Throughout the present disclosure, the term "local network" refers to a local transmission network that is to be created by implementing an application layer (OSI L7), which interacts directly with local services provided by clients or bots (for example, software applications provided by the clients or bots), without requiring any outside transmission network. Notably, an outside transmission network is typically required to transfer data between two or more local transmission networks.

Optionally, local networks of the data communication system are mutually interconnected, via network node services executing on their network nodes, to form a mesh network (see https://en.wikipedia.org/wiki/Mesh_networking). One such mesh network has been shown in conjunction with FIG. 1. Optionally, the mesh network is formed for grid computing purposes (see https://en.wikipedia.org/wiki/Grid_computing). It will be appreciated that different clients or bots executing on the network devices of the data communication system are used only when required, and can be shared by interconnection, for example, by grid computing to combine huge amount of computational resources. Thus, the data communication system is capable of offering a much safer, ecological and more affordable alternative to conventional data centres. Moreover, a given local network of the data communication system can be implemented using mobile or wearable devices to provide desired services through various clients or bots based on a dynamically-moving grid network.

It will be appreciated that a given network device is configured to execute a given client or bot to provide a desired service to one or more clients or bots executing on one or more other network devices. It will be appreciated that actual data communication between two given network devices is performed by clients (see https://en.wikipedia.org/wiki/Client_(computing)) or bots (see https://en.wikipedia.org/wiki/Software_agent) executing on the two given network devices. Optionally, the given client or bot is, by default, persistently connected to the network node service provided by its associated network node. There is thereby provided a solution enabling local services to be provided in a local network of network devices, thereby replacing services that are contemporarily provided by conventional data centres.

It will be appreciated that a given bot is capable of providing a protected service from a possibly non-protected network device and software executing thereon to a user of the given bot and to desired third parties. In other words, the data communication system pursuant to embodiments of the present disclosure provides improved protection as the data is stored in an encrypted form at both endpoints, namely a network device executing the source client or bot and one or more network devices executing the one or more destination clients or bots.

Pursuant to embodiments of the present disclosure, services are programmatically provided by clients or bots, which are connected to network node services provided by their corresponding network nodes. This enables such services to be produced on hardware-independent cross-platform software solutions. In other words, a same functionality of a given service can be executed on network devices having different target platforms (for example, such as x86/x64/AArch64 and so forth).

In an embodiment of the present disclosure, a given network node service is configured to process only compatible connections between two given clients or bots. Optionally, in this regard, the given network node service is configured to support a wide range of mutually different applications and services locally and remotely, for example, such as:
- a FaaS-like cloud computing kind of execution model (see https://en.wikipedia.org/wiki/Serverless_computing);
- a PaaS-like application platform to manage and run applications without a typical infrastructure associated for developing and executing them (see https://en.wikipedia.org/wiki/Platform_as_a_service); and
- a SaaS-like software delivery model that is centrally hosted (see https://en.wikipedia.org/wiki/Software_as_a_service).

In order to support the wide range of mutually different applications and services, the clients or bots are configured to perform certain functionalities for users of the data communication system, whether or not the users have interfaces.

Optionally, in this regard, the bots are implemented as software agents that are configured to act for a user, a program or a service in relationship of an agency. Optionally, such software agents are defined as three types of bots: a protocol bot, a client bot and a server bot, which are defined for different kinds of purposes to offer effective Application Programming Interfaces (API's) for third party service providers to develop and, optionally, monetize their services based upon the data communication system pursuant to embodiments of the present disclosure. It will be appreciated that these types of bots provide an interface that enables different devices and services from private or public networks to establish a protected connection with the network devices of the data communication system. By "protected connection", it is meant that data produced by the devices and services is protected using encryption, and is delivered via relay through the network node service of the local network. As a result, the data is protected from traditional forms of attack arising from both inside and outside of the local network. Moreover, it is not possible for traditional forms of attack to eavesdrop on the encrypted information content of the data.

Optionally, a protocol bot is configured to translate different communication and command protocols to support services provided by the network devices of the data communication system. As an example, a given protocol bot can be configured to connect different types of media players on different target platforms to support services provided by network devices that produce audio visual content (for example, such as surveillance cameras, televisions, playback videos, and so forth). In other words, the given protocol bot can be configured to adapt information content of communicated data and its content format as per a target device. Such adaptation can be performed, for example, as described in a UK patent document GB2514543. Services provided by such bots are employed to adapt the information content as per a given platform of a target device, regardless of built-in ecosystem software of the target device.

Optionally, a protocol bot is a media player bot that is configured to translate audio-visual information as per a media player associated therewith. The media player could be executing on a local device or a remotely connected device, wherein the media player bot is coupled to the media player. Optionally, in such a case, the media player bot is configured to adapt a video and audio to a format that is compatible with the media player of the connected device, prior to delivering the video and audio. The media player of the connected device then renders the video and audio received from the bot. Optionally, in this regard, the media player bot is configured to recognize and understand technical requirements of the media player of the connected device, thereby enabling adaptation of the video and audio to the format that is compatible with the connected device, both from a point of view of a transmission protocol as well as of a video format and an audio format. As an example, a media player of a user's mobile phone can use a service provided by a media player bot to access TV or camera video feed anytime and from anywhere in the world.

Optionally, a client bot is configured to act as an application for users to offer different types of features. As an example, a given client bot can be configured to offer a feature of video recording and playback, wherein a given user is provided a Graphical User Interface (GUI) to select videos. As another example, a given client bot can be configured to offer a feature of a nurse or a doctor, based upon Artificial Intelligence (AI) to potentially assist a user.

Optionally, a server bot is configured to act as a server to provide a desired service. As an example, a given server bot can be configured to provide an e-mail service as per personal requirements of a given user. As another example, a given server bot can be configured to host a user database for a company to support different kinds of login interfaces on existing information systems.

Optionally, a server bot is an email bot that is configured to act as an email server that provides an e-mail service as per a user's personal requirements. Optionally, the email bot is configured to enable various functionalities, for example, such as secure e-mail and spam protection.

Moreover, it will be appreciated that a given network node service and a given client or bot can be implemented in a same physical device or separate physical devices. Examples of target software platforms that are technically suitable for implementing the given network node service and the given client or bot include, but are not limited to, Unix®, Linux®, Windows®, OS X®, Android® and iOS®. Notably, a selected ecosystem on a given target software platform defines requirements for effective implementation and requirements for programming languages and tools. Thus, the data communication system pursuant to embodiments of the present disclosure is beneficially designed to work in Gurulogic Microsystem's Starwindow® ecosystem, which provides a Starwindow® framework Application Programming Interface (API) to support a high-level development environment to allow third-party services to be used in the data communication system. Moreover, the Starwindow® ecosystem is built based upon a multi-layer architecture, wherein everything else, but services for a given target platform, are built based upon a hardware-independent software solution.

Optionally, a given network node is implemented by way of a low power Central Processing Unit (CPU), by employing IOLoop technology. This makes it possible to deliver a network node service programmatically even with the low power CPU. Using the IOLoop technology, the given network node is configured to handle all connections to the network node service in one thread. This enables significantly more cost-effective Input/Output (I/O) communications and a technically faster implementation compared to conventional known approaches that provide a dedicated thread for each connection, which are executed in one or more CPU cores. As an example, contemporary communication technology for mobile communication devices is designed to work with minimal energy consumption; therefore, using the IOLoop technology for a new purpose provides a highly cost-effective solution as described with reference to embodiments of the present disclosure.

Furthermore, as mentioned earlier, a given network node service is configured to validate and authenticate local services provided by clients or bots within its own local network. Optionally, in this regard, the given network node service is configured to authenticate the local services provided by these clients or bots with accepted credentials, when the clients or bots join the local network.

Additionally or alternatively, optionally, authentication requests are validated and authenticated by a registration service. Optionally, in this regard, the data communication system is configured to register, with the registration service, the services provided by the clients or bots of the first and second local networks.

Optionally, each client or bot has its own key store, which stores credentials of a user using that client or bot). The credentials are used to sign-in to the service and authenticate the user, depending on an authentication request that is required to be validated. Optionally, the credentials of the user (stored in the key store) are used to encrypt the data to be communicated and/or to perform subsequent decryption.

As an example, the authentication can be implemented as described in a UK patent document GB2554082. As another example, the authentication can be implemented using digest authentication techniques. It will be appreciated that the authentication is implemented in compliance with General Data Protection Regulation (GDPR).

Moreover, optionally, the registration service is used to register connection addresses for the services and their clients or bots.

Optionally, the data communication system is configured to register, with the registration service, a given service provided by a given client or bot as a private service or a public service in respect of a user of the given client or bot. Optionally, a given local service is registered as a private service or a public service for the user of the given client or bot, after the given local service is validated and authenticated.

It will be appreciated that such registration makes it easier for a given user to maintain and configure all services registered for the given user. As an example, a third party service provider may build its own services and register these services with the registration service; in such a case, the third party service provider is a user of these services, and provides these services to various remote users. Optionally, the registration service is configured to provide a given user with a user interface that allows the given user, upon successful sign-in, to view all services that are available in the given user's local networks and to enable or disable certain services for use.

Optionally, the registration service is provided as a centralized back-end service by a "super node" defined in the data communication system. Optionally, the node providing the registration service is selected from amongst the first network node and the second network node. Alternatively, optionally, the super node is provided by a third party.

It should be noted that a super node works in a static manner, whereas the network nodes are dynamic.

Optionally, the data communication system is configured to function in a hardware-independent manner, wherein secure services are produced in network devices owned, administered or leased by a given user. Optionally, in this regard, all data produced by these services is protected in respect of the given user, namely using a key store associated with the given user.

Optionally, in a given network device, a given service provided by a client or bot executing on the given network device is integrated with a key store associated with a user of the client or bot, such that only services integrated with the key store are allowed to access the key store and use key materials stored or generated therein. Optionally, once integrated with the key store, the service is provided by the client or bot executing on the given network device with protection from a kernel of the given network device.

Optionally, the information content of the data is encrypted by using one or more content encryption methods. Optionally, the content encryption is achieved by using a form of symmetrical encryption block cipher algorithm (see https://en.wikipedia.org/wiki/Block_cipher), for example, such as Advanced Encryption Standard (AES). Alternatively, optionally, the content encryption is achieved by using a stream cipher algorithm (see https://en.wikipedia.org/wiki/Stream_cipher), for example, such as ChaCha algorithm. Such content encryption enables the data communication system to function reliably and handle data produced therein in a manner that the data is content-protected in respect of its rightful owner.

It will be appreciated that, in some cases, the user can be a group of users or devices in respect of which the data shall be protected. In such a case, even if the group is typically managed by one member of the group, other group members are also able to access the data produced by the group and to produce data to the group, pursuant to predefined group rules. Optionally, in this regard, the group is defined for a specific purpose, wherein the group members are allowed to store and access unspecified data in a secure manner. As an example, the group can be a phone group, wherein the group members can store and access data exchanged between a plurality of phones belonging to the group members. As another example, the group can be a camera group, wherein the group members can store and access image data captured by a plurality of cameras. As yet another example, the group can be a negotiation group, wherein the group members can negotiate with each other.

Optionally, at least one of the services is shared, pursuant to authorization by the given user, with one or more registered users remotely. It will be appreciated that the data communication system allows the given user to produce own services using local resources (namely, network devices) and to share these services with remote users without compromising security.

Additionally, optionally, the given user is provided with a user interface that allows the given user to control an extent to which data produced by the at least one of the services is divulged to third parties and subsequently utilized for various purposes (for example, such as marketing, targeted advertising and so forth). As a result, for example, search engines cannot gain access to the given user's protected data and make use of it without permission from the given user. This enables a safer information society to be achieved.

Furthermore, optionally, in the data communication system, a given local network is created in a dynamic manner. Optionally, in this regard, the given local network is created dynamically as a programmatic local network by implementing an application layer (OSI L7), which interacts directly with local services that are available via clients or bots executing on connected network devices. In this regard, a network node service provided by a network node of the given local network registers all the local services provided by the clients or bots executing on the connected network devices of the given local network. More optionally, services provided by network devices that are no longer connected or available are removed from the given local network automatically, while new services that are made available by newly connected network devices are added to the given local network automatically. In other words, services can be added to or removed from the given local network.

Optionally, the clients or bots executing on the network devices exist in a dynamic network environment, wherein the clients or bots are configured to find a centralized network node service in a Local Area Network (LAN) without prior configuration using one or more discovery protocols. Examples of such discovery protocols include, but are not limited to, Service Location Protocol (SLP; see https://en.wikipedia.org/wiki/Service_Location_Protocol) and Bonjour by Apple Inc. (see https://en.wikipedia.org/wiki/Bonjour_(software)).

Alternatively, optionally, a given local network is created in a static manner. Optionally, in this regard, clients or bots are statically addressed to connect to a given network node service. This is particularly beneficial in situations where services are produced in a static network environment, for example, inside a same network device or in a controlled corporate network.

Moreover, pursuant to embodiments of the present disclosure, a communication protocol is defined for enabling data communication in the data communication system, and is mutually agreed between the clients or bots executing on the network devices of the data communication system. Optionally, in this regard, a given network node service is configured to create a local network having the programmatic star configuration, and is inter-connected with at least one other network node service of another local network having the programmatic star configuration. The clients or bots communicate with each other via relay through their associated network node services. As a result, the data communication system is implemented in a form of a programmatically-built star configuration. Notably, a suitable content-encryption method is beneficially integrated into the communication protocol, so as to handle the data produced within the data communication system in a secure manner.

Pursuant to embodiments of the present disclosure, a client or bot of the first local network does not connect directly with a client or bot of the second local network, but relays data through the first and second network node services. However, it will be appreciated that the client or bot of the first local network may connect directly to the second network node service to relay the data to the client or bot of the second local network, if the connection address of the second network node service is known and is available for connection. This has been illustrated in conjunction with FIGS. 4A and 4B later.

Optionally, the data communication system is configured to utilize one or more data communication networks existing in the first and second local networks for data communication. It will be appreciated that the communication protocol is defined in a manner that it is practical and efficient for all the clients or bots of the data communication system, because the communication protocol has to utilize a physical network (for example, such as a wired Ethernet, a wireless Wi-Fi® network, a wireless Li-Fi, or a wireless Bluetooth® connection) to execute actual data transmission tasks based upon communication of packet data. The physical network utilizes one or more upper layers of the OSI model. Optionally, in this regard, the physical network is to be created by implementing a transport layer (OSI L4) over an existing network layer (OSI L3). In other words, the physical network utilizes an L4 layer-based interface. As an example, for home, office and factory working purposes, it is efficient to use existing wired or wireless data communication networks. Such data communication networks usually employ the Internet® protocol (IP).

It will be appreciated that in order to support the application layer (OSI L7), the transport layer (OSI L4), a session layer (OSI L5) and a presentation layer (OSI L6) are required to be supported.

Additionally, optionally, in the data communication system, data communication is implemented using low-energy communication techniques, for example, such as Bluetooth Low Energy (BLE) or by utilizing certain dedicated frequency-based communication technology. This potentially enables network devices involved in such a low-energy data communication to have a long-lasting battery.

Optionally, the communication protocol is technically based, by default, on a suitable packet data communication protocol. As an example, the communication protocol can be based on the Internet protocol, for example, such as the Transmission Control Protocol/Internet Protocol (TCP/IP). It is advantageous to use a communication protocol that is widely used in private and public networks, so as to be able to handle known issues with firewalls and anti-virus services.

It will be appreciated that the data communication occurring within the data communication system is transparent to a physical network infrastructure. In other words, wired or wireless communication technologies can be used as long as they can adapt to the mutually-agreed communication protocol. As an example, TCP/IP can be used with Wi-Fi® and Bluetooth®.

As mentioned above, a given network node service tries to connect directly to other network node services, using physically available communication protocols. Optionally, when using the Internet protocol (IP), direct connections are used based on IPv4 or IPv6 connection addresses.

Optionally, when a direct connection cannot be established, for example in a case where other network node services exist remotely in different Local Area Networks (LAN's), the given network node service is configured to employ hole punching technology based on Session Traversal Utilities for NAT (STUN; see https://en.wikipedia.org/wiki/STUN) to traverse through endpoints that are located in different network addresses. However, some corporate firewalls can prevent STUN based technologies, because User Datagram Protocol (UDP) is not allowed to be used. Optionally, in such a case, the given network node service is configured to employ a technology that is based on Traversal Using Relays around NAT (TURN; see https://en.wikipedia.org/wiki/TURN). This will provide connectivity between the network node services, but will route all communication through a centrally available service. As an example, the centrally available service could be implemented by way of the aforementioned registration service provided by the super node of the data communication system.

Optionally, the given network node service is configured to employ Interactive Connectivity Establishment (ICE; see https://en.wikipedia.org/wiki/Interactive_Connectivity_Establishment) for connecting to the other network node services. It will be appreciated that the ICE technique combines both STUN and TURN techniques.

Additionally or alternatively, optionally, in order to support direct connection between the network node services, a Universal Plug and Play (UPnP; see https://en.wikipedia.org/wiki/Universal_Plug_and_Play) networking protocol is employed to allow automatically configuring local network devices, for example, such as routers and firewalls, to open direct communication access between the network node services. However, in such a case, it is important that authentication is properly implemented to avoid any security problems.

Pursuant to embodiments of the present disclosure, the data communication system provides a cost-efficient and fault-tolerant solution for providing services for a given user in network devices of a local network, in comparison to conventional data communication systems where services are provided via remote data centres. In other words, computing tasks associated with the services is offloaded to the local network, thereby saving on energy utilization. Thus, the services are provided for the given user in a comprehensive and more cost-effective manner, namely in a more local manner. As a result, the data communication system pursuant to embodiments of the present disclosure is not only capable of fulfilling today's needs, but also future's needs, where users can produce services for their own use, using clients or bots executing on efficiently integrated local network devices in local networks. Moreover, data produced by the services is protected in respect of the given user of the clients or bots.

In contradistinction to conventional data communication networks that are based upon connected devices in a physically open local network, the data communication system pursuant to embodiments of the present disclosure is configured to provide services in a local network for a given user with an added data protection functionality. Data produced by the services is protected for the given user using a built-in security service module (namely, a client or bot), and is delivered via relay through a network node service of the local network. As a result, the data is protected from traditional forms of attack arising from both inside and outside of the local network. Moreover, it is not possible for traditional forms of attack to eavesdrop on the encrypted information content of the data.

Moreover, the aforementioned data communication system enables the user to register the services as public or private services, and to share the public services with remote users. In other words, the data communication system enables the user to decide as to where data produced by a given service is permitted to be shared and for what purposes. As a result, search engines and other third parties cannot gain access to the user's protected data and make use of it without permission from the user. This enables a safer information society to be achieved.

In a second aspect, embodiments of the present disclosure provide a method of communicating data, via a data communication system for a local network, the data communication system comprising at least one network node and a plurality of network devices associated with the at least one network node, characterized in that the method comprises:

provding, via the at least one network node, a network node service to a plurality of clients or bots executing on the plurality of network devices, wherein individual clients or bots of the plurality of clients or bots are communicably and only programmatically coupled around the network node service in a programmatic star configuration to create the local network, further wherein the network node service is configured to validate and authenticate local services provided by the plurality of clients or bots within the local network;

communicating data together with metadata from a source client or bot to one or more destination clients or bots within the local network in real time or near real time, by relaying the data through the network node service; and encrypting, at the source client or bot, information content of the data prior to communicating the data to the one or more destination clients or bots, wherein a key store is employed to encrypt the information content of the data, the key store being associated with a user of the source client or bot, wherein the metadata comprises:

encryption information indicative of a unique identifier (ID) of the key store and a key index of a key material to be derived from the key store for subsequent decryption of the encrypted information content of the data, and group information indicative of the one or more destination clients or bots to which the data is to be communicated, wherein the source client or bot and the one or more destination clients or bots together form a group.

Various embodiments and variants disclosed above apply mutatis mutandis to the method.

Optionally, the at least one network node comprises at least a first network node and a second network node, and the plurality of network devices comprise a first set of network devices associated with the first network node and a second set of network devices associated with the second network node. Optionally, in such a case, the method comprises providing, via the first network node, a first network node service to a first set of clients or bots executing on the first set of network devices, and providing, via the second network node, a second network node service to a second set of clients or bots executing on the second set of network devices. Optionally, in this regard, individual clients or bots of the first set of clients or bots are communicably and only programmatically coupled around the first network node service in a programmatic star configuration to create a first local network, while individual clients or bots of the second set of clients or bots are communicably and only programmatically coupled around the second network node service in a programmatic star configuration to create a second local network, further wherein the first and second network node services are configured to validate and authenticate local services provided by the first and second sets of clients or bots within their respective local networks.

Optionally, when a given source client or bot and a given destination client or bot are from within a same local network, the method comprises relaying data to be communicated, in real time or near real time, through their associated network node service within the same local network.

Optionally, when a given source client or bot and a given destination client or bot are from a different local network, the method comprises relaying data to be communicated, in real time or near real time, through a network node service associated with the given source client or bot and through a network node service associated with the given destination client or bot.

Optionally, the metadata is communicated in an unencrypted form. Alternatively, optionally, the metadata is communicated in an encrypted form.

Optionally, the method further comprises utilizing one or more data communication networks existing in the first and second local networks for data communication.

Optionally, the method further comprises registering, with a registration service, services provided by clients or bots of the first and second local networks. Optionally, the method further comprises registering, with the registration service, a given service provided by a given client or bot as a private service or a public service in respect of a user of the given client or bot, as described earlier.

Optionally, the method further comprises creating a given local network in a dynamic manner, for example, as described earlier.

In a third aspect, embodiments of the present disclosure provide a computer program product comprising a non-transitory computer-readable storage medium having computer-readable instructions stored thereon, the computer-readable instructions being executable by a computerized device comprising processing hardware to execute a method of the aforementioned second aspect.

Next, embodiments of the present disclosure will be described with reference to figures.

Figure 1:
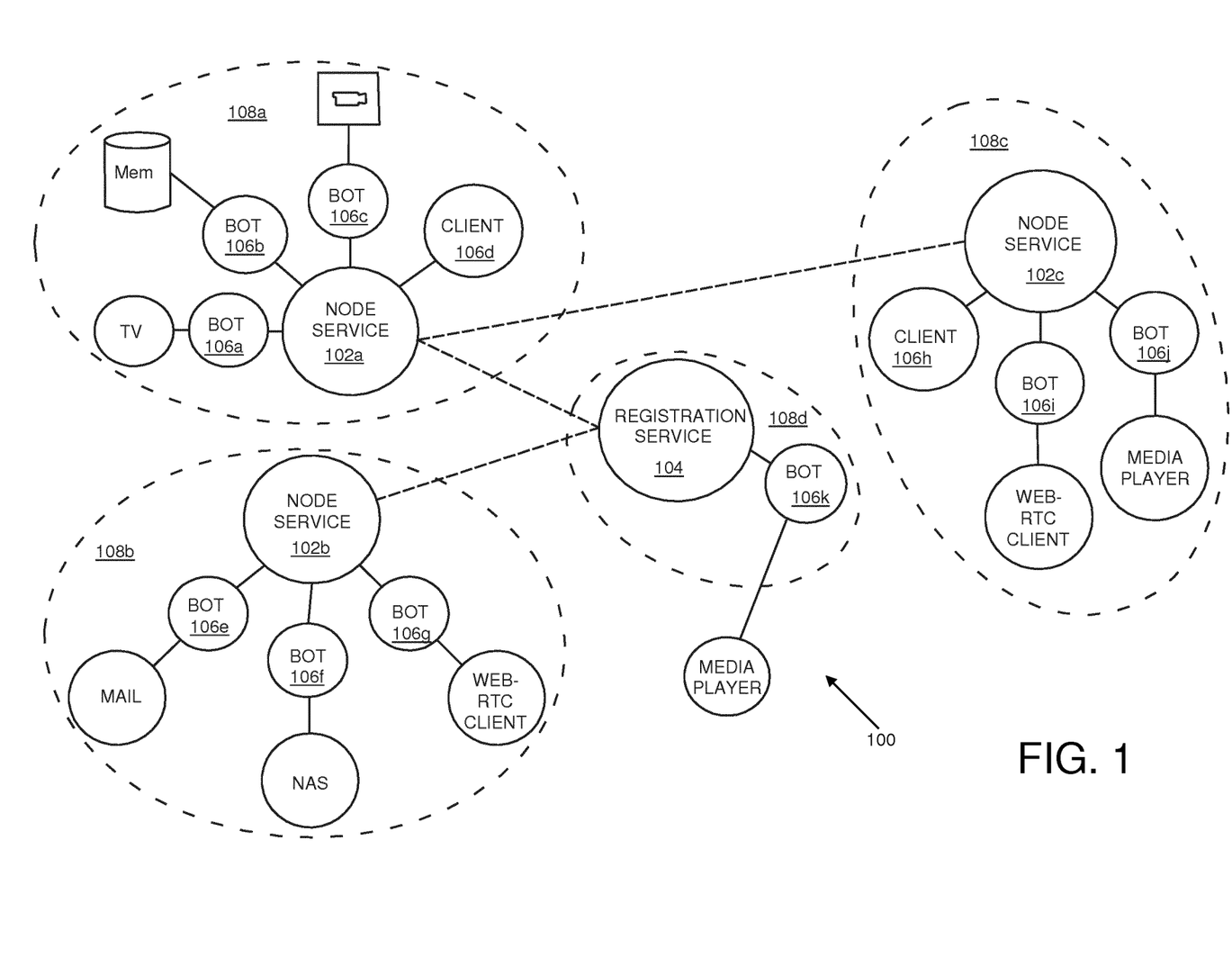
FIG. 1 is a schematic illustration of a data communication system, in accordance with an embodiment of the present disclosure.

FIG. 1 is a schematic illustration of a data communication system 100, in accordance with an embodiment of the present disclosure. The data communication system 100 includes a plurality of network nodes 102a, 102b and 102c, a super node 104 and a plurality of network devices 106a, 106b, 106c, 106d, 106e, 106f, 106g, 106h, 106i, 106j and 106k (hereinafter collectively referred to as the network devices 106 for the sake of convenience). The network nodes 102a, 102b and 102c are configured to provide network node services, while the super node 104 is configured to provide a registration service. Clients are executing on the network devices 106d and 106h, while bots are executing on the network devices 106a, 106b, 106c, 106e, 106f, 106g, 106i, 106j and 106k. In FIG. 1, the network devices 106 represent a variety of devices, for example, such as a television (TV) set, a data storage device, a surveillance camera, an e-mail server, a file system, a media player or any other remotely-connected device.

With reference to FIG. 1, the bots executing on the network devices 106a, 106b and 106c and the client executing on the network device 106d are communicably coupled around the network node service provided by the network node 102a to create a local network 108a. The bots executing on the network devices 106e, 106f and 106g are communicably coupled around the network node service provided by the network node 102b to create a local network 108b. The client executing on the network device 106h and the bots executing on the network devices 106i and 106j are communicably coupled around the network node service provided by the network node 102c to create a local network 108c. The bot executing on the network device 106k is communicably coupled to the registration service provided by the super node 104 to create a local network 108d.

With reference to FIG. 1, the network node service provided by the network node 102a is connected to the network node service provided by the network node 102c and the registration service provided by the super node 104, while the network node service provided by the network node 102b is connected to the registration service provided by the super node 104, thereby forming a mesh network.

As a first example, the bot executing on the network device 106a is a protocol bot that could be configured to connect a television (TV) set to services provided by network devices that provide audio visual content. An example of such services is Android TV API.

As a second example, the bot executing on the network device 106b is a memory bot that could be configured to store collected statistical data at a data storage device associated therewith. Such statistical data may be transferred to or received from different services. An example of the statistical data is TV and camera images.

As a third example, the bot executing on the network device 106c is a protocol bot that could be configured to connect different types of media players on different target platforms to support services provided by one or more surveillance cameras.

As a fourth example, the bot executing on the network device 106e is a server bot that could be configured to act as an email server that provides an e-mail service as per a user's personal requirements. Such a bot may enable various functionalities, for example, such as secure e-mail and spam protection.

As a fifth example, the bot executing on the network device 106f is a server bot that could be configured to manage a file system thereof.

As a sixth example, the bots executing on the network devices 106g and 106i are protocol bots that could be configured to translate information as per a target platform of a remotely connected device.

As a seventh example, the bots executing on the network devices 106j and 106k are protocol bots that could be configured to translate audio-visual information as per media players associated therewith. Such media players could be executing on a local device or a remotely connected device.

With reference to FIG. 1, the bot executing on the network device 106k is coupled to a media player of a remotely connected device. The bot is configured to adapt a video and audio to a format that is compatible with the media player of the connected device, prior to delivering the video and audio. The media player of the connected device then renders the video and audio received from the bot. In other words, the bot is configured to recognize and understand technical requirements of the media player of the connected device, thereby enabling adaptation of the video and audio to the format that is compatible with the connected device, both from a point of view of a transmission protocol as well as of a video format and an audio format. As an example, a media player of a user's mobile phone can access TV or camera video feed anytime and from anywhere in the world.

FIG. 1 is merely an example, which should not unduly limit the scope of the claims herein. A person skilled in the art will recognize many variations, alternatives, and modifications of embodiments of the present disclosure.

Figure 2:
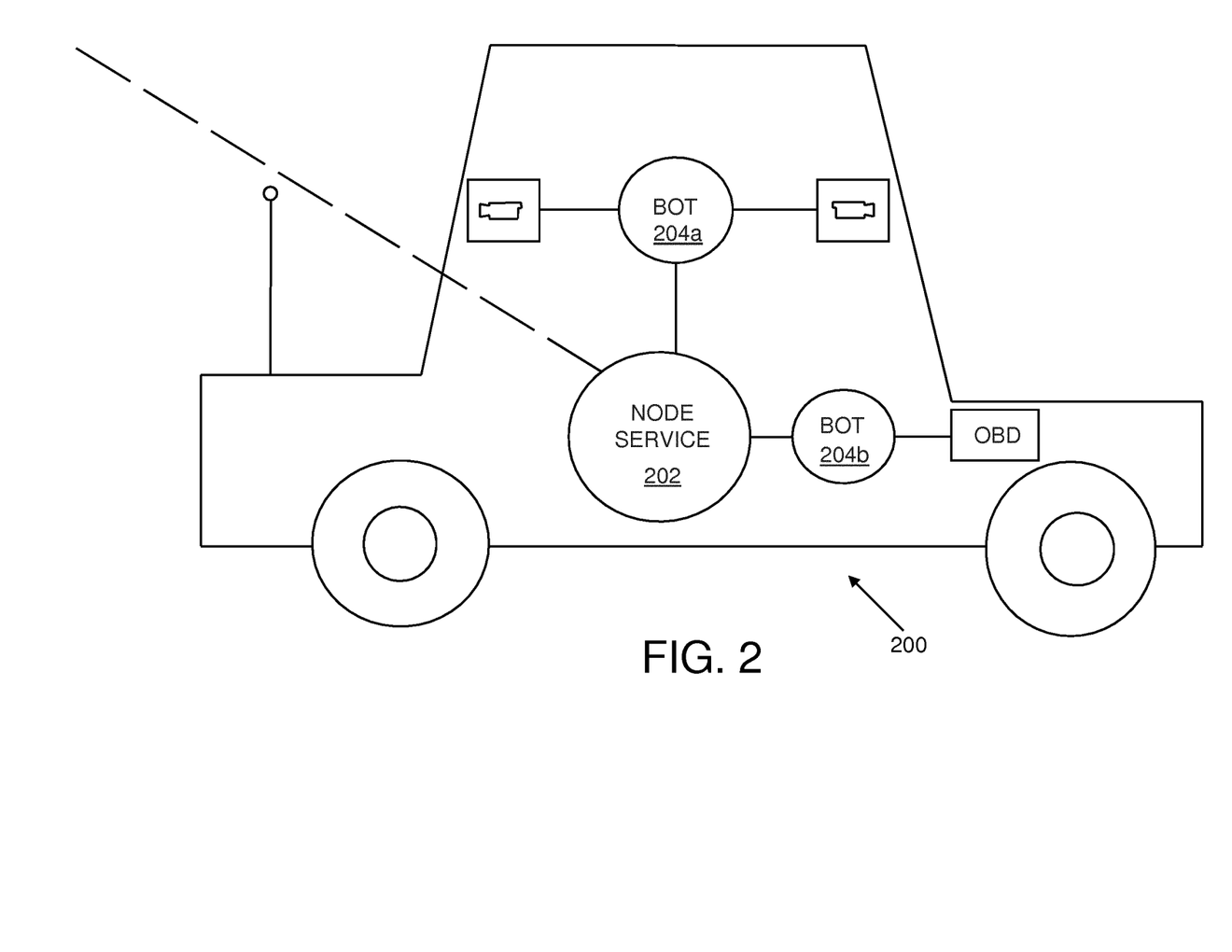
FIG. 2 is a schematic illustration of an example local network, in accordance with an embodiment of the present disclosure.

Referring next to FIG. 2, there is depicted an example local network 200, in accordance with an embodiment of the present disclosure.

With reference to FIG. 2, the local network 200 is physically implemented on a vehicle, namely a car. The local network 200 includes a network node service 202, which is installed in the vehicle, and bots 204a and 204b associated therewith.

The bot 204a is configured to employ cameras of the vehicle for providing various services to a user owning or administering the vehicle. As an example, images captured from a surrounding environment can be collected and processed to provide a safer traffic control. As another example, the cameras can also provide a safety feature when the vehicle is a taxi, for example, for both a driver and a passenger of the taxi.

The bot 204b is configured to employ an On-Board Diagnostics (OBD) system of the vehicle for providing various services to the user owning or administering the vehicle. As an example, data collected from the OBD system can be processed for various purposes, for example, such as for providing emergency services, for theft prevention, for crash detection and/or prevention, and the like.

The network node service 202 is connected to at least one other network node service, via a wireless communication interface that is based on, for example, Wi-Fi®, Bluetooth®, Li-Fi and the like. The at least one other network node service could be a part of a local network that is physically available at the user's home or office premises. This allows the user to monitor the vehicle remotely, for example, in a case when the vehicle is an automatic driverless vehicle or a drone.

FIG. 2 is merely an example, which should not unduly limit the scope of the claims herein. A person skilled in the art will recognize many variations, alternatives, and modifications of embodiments of the present disclosure.

Figure 3:
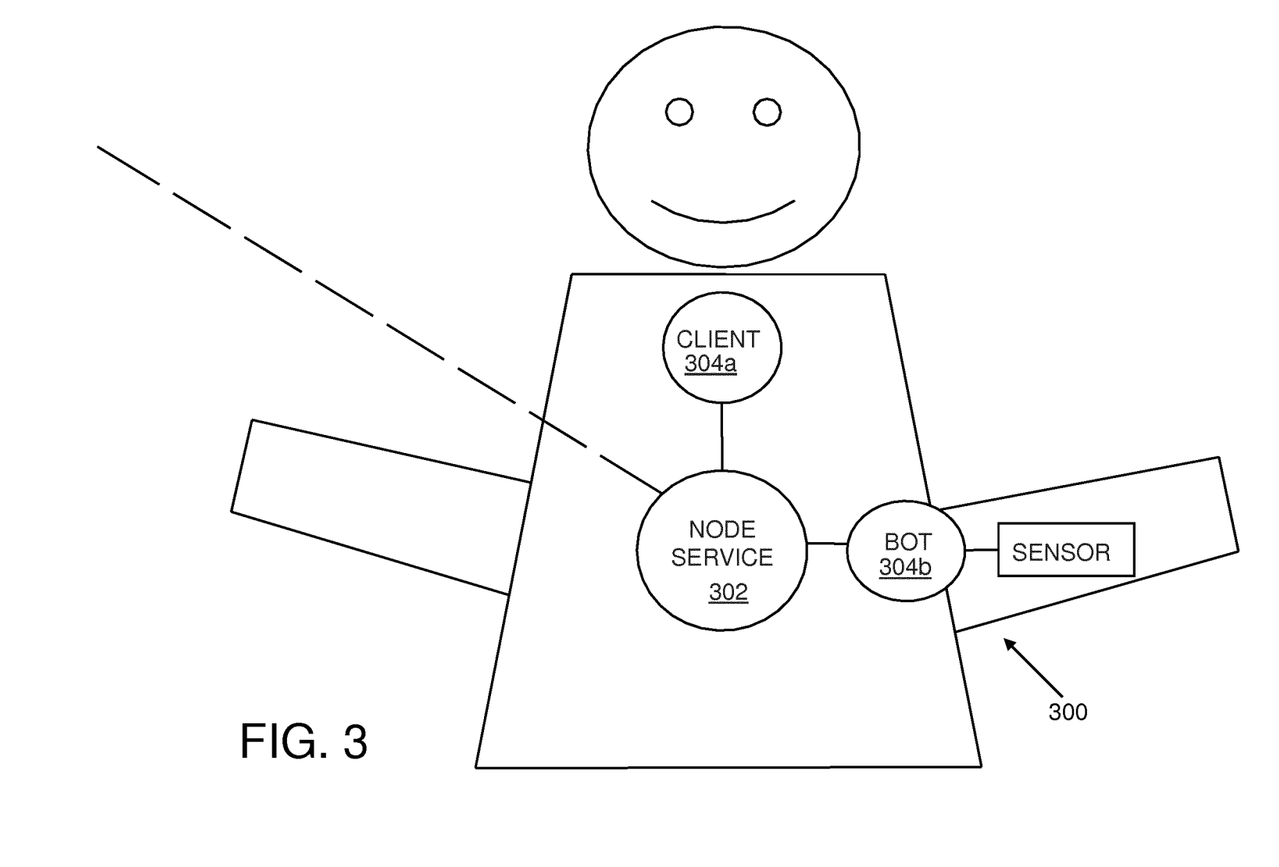
FIG. 3 is a schematic illustration of another example local network, in accordance with an embodiment of the present disclosure.

Referring next to FIG. 3, there is depicted another example local network 300, in accordance with an embodiment of the present disclosure.

With reference to FIG. 3, the local network 300 is implemented by way of a network node service 302, a client 304a and a bot 304b executing on network devices that are carried or worn by a human user. Notably, these network devices are not fixed or physically installed on the user, but are only carried or worn by the user. Optionally, the network node service 302 is provided by a mobile communication device of the user, for example, such as a smart telephone, a smart watch and the like.

The client 304a is configured to provide various services to the user, for example, for playing music on an earphone of the user, displaying virtual images on a virtual reality headset of the user, and the like.

Optionally, the bot 304a is configured to employ at least one sensor for various monitoring purposes, for example, for monitoring a heart rate of the user, a work-out performed by the user, and the like.

The network node service 302 is connected to at least one other network node service, via a wireless communication interface that is based on, for example, Wi-Fi®, Bluetooth®, Li-Fi and the like. As an example, the at least one other network node service could be a part of a local network that is physically available at the user's home. As an example, this could allow a family member to monitor the health of the user remotely. As another example, this could allow remote monitoring of a nursing service provided to a senior elderly person living alone in his/her home.

FIG. 3 is merely an example, which should not unduly limit the scope of the claims herein. A person skilled in the art will recognize many variations, alternatives, and modifications of embodiments of the present disclosure. For example, the network devices could be carried or worn by a creature.

Figure 4A:
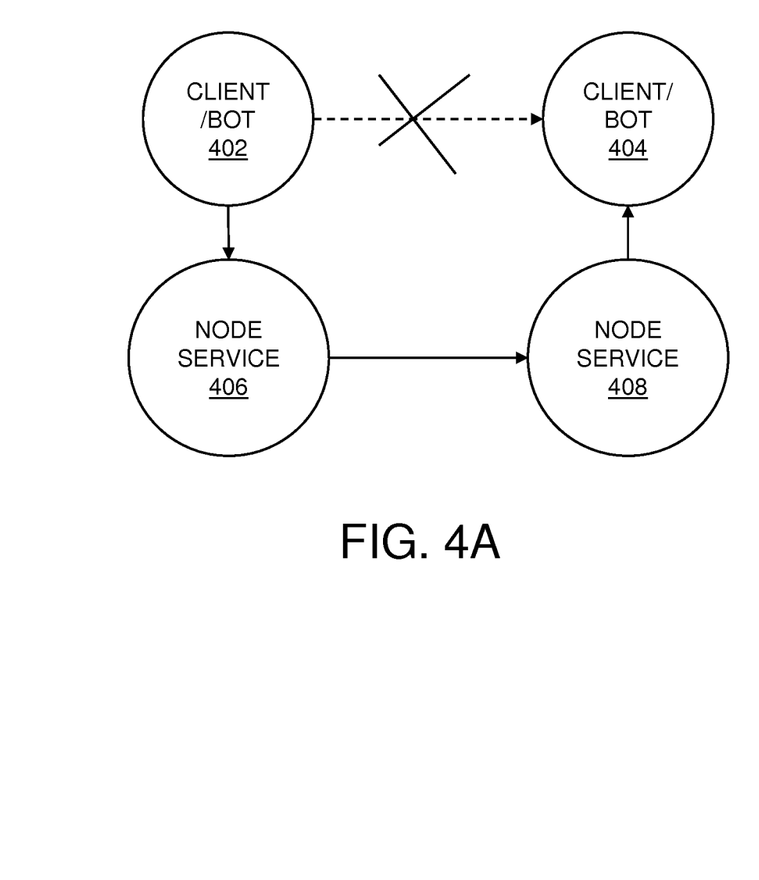
FIGS. 4A and 4B are schematic illustrations of how a client or bot may communicate with another client or bot from a different local network, in accordance with an embodiment of the present disclosure.
Figure 4B:
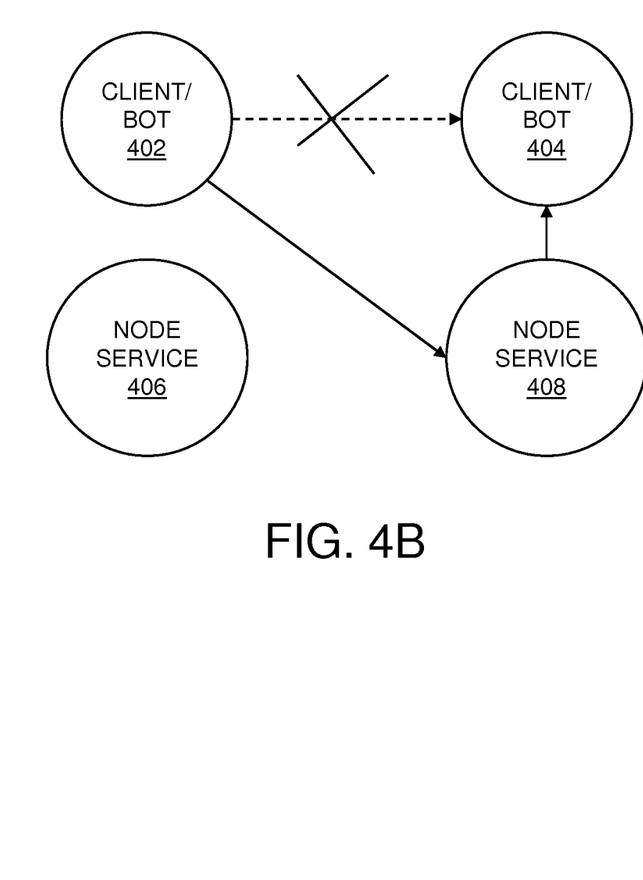

FIGS. 4A and 4B are schematic illustrations of how a client or bot 402 may communicate with a client or bot 404 from a different local network, in accordance with an embodiment of the present disclosure.

With reference to FIG. 4A, the client or bot 402 does not connect directly with the client or bot 404, but relays data through a first network node service 406 and a second network node service 408, which are associated with the client or bot 402 and the client or bot 404, respectively.

With reference to FIG. 4B, the client or bot 402 connects directly to the second network node service 408 to relay the data to the client or bot 404, if the connection address of the second network node service 408 is known and is available for connection.

Figure 5:
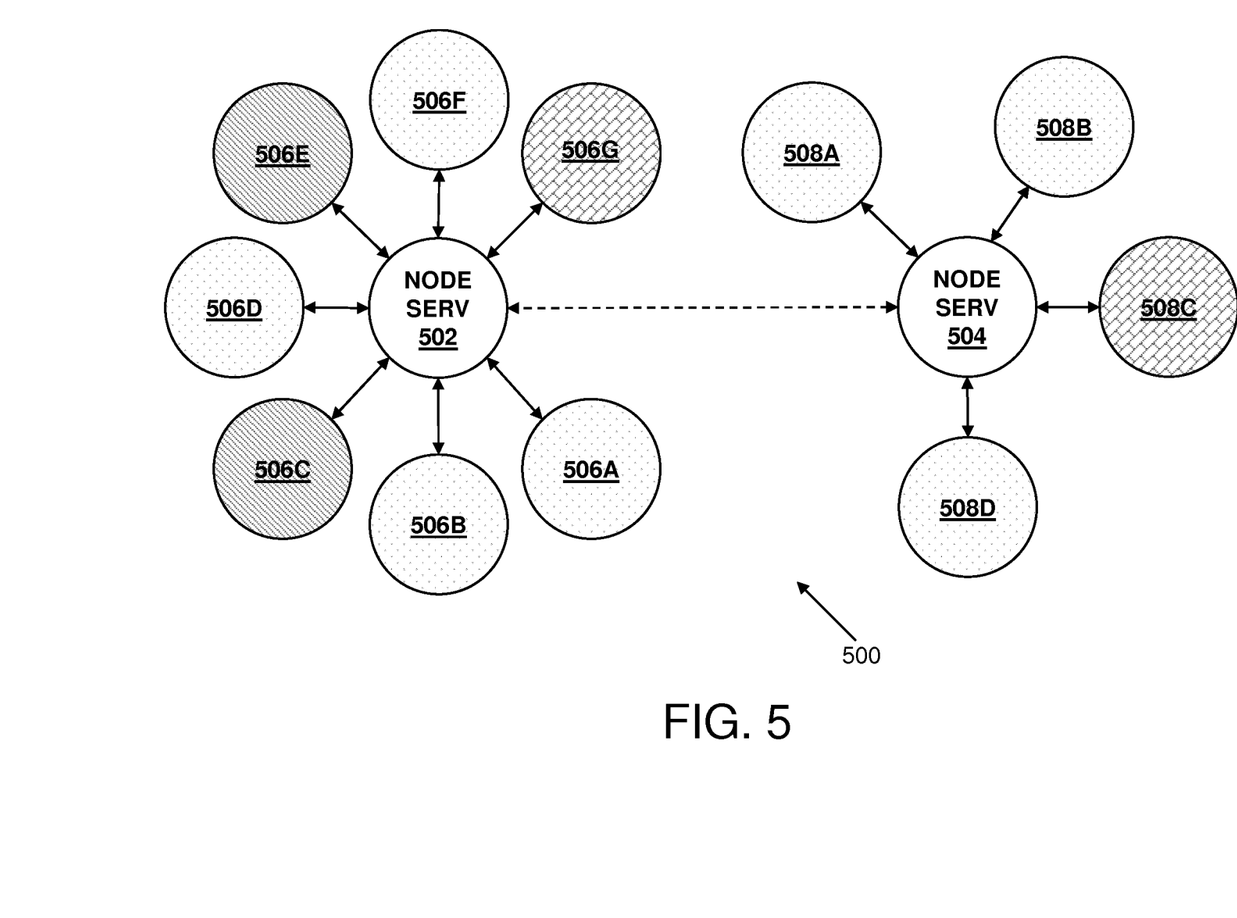
FIG. 5 is a schematic illustration of a plurality of groups defined in a data communication system, in accordance with an embodiment of the present disclosure.

FIG. 5 is a schematic illustration of a plurality of groups defined in a data communication system 500, in accordance with an embodiment of the present disclosure.

The data communication system 500 comprises network nodes 502 and 504 providing network node services, a first set of network devices including network devices 506A, 506B, 506C, 506D, 506E, 506F and 506G executing clients or bots, and a second set of network devices including network devices 508A, 508B, 508C and 508D executing clients or bots.

The clients or bots executing on the network devices 506A, 506B, 506C, 506D, 506E, 506F and 506G are communicably coupled around the network node service provided by the network node 502 in a programmatic star configuration to create a first local network, while the clients or bots executing on the network devices 508A, 508B, 508C and 508D are communicably coupled around the network node service provided by the network node 504 in a programmatic star configuration to create a second local network. It will be appreciated that the first and second local networks are created by implementing an application layer (OSI L7), which interacts directly with local services provided by the clients or bots.

With reference to FIG. 5, three different groups have been defined in the data communication system 500, wherein the clients or bots executing on the network devices 506A, 506B, 506D, 506F, 508A, 508B and 508D form a first group, the clients or bots executing on the network devices 506G and 508C form a second group, and the clients or bots executing on the network devices 506C and 506E form a third group. Notably, a given group may include clients or bots from a same local network or from different local networks.

FIGS. 4A-B and 5 are merely examples, which should not unduly limit the scope of the claims herein.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "one or more" is to be construed in a likewise manner.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

We claim:

1. A data communication system for a local network, the data communication system comprising at least one network node and a plurality of network devices associated with the at least one network node, wherein:

the at least one network node is configured to provide a network node service to a plurality of clients or bots executing on the plurality of network devices, wherein individual clients or bots of the plurality of clients or bots are communicably and only programmatically coupled around the network node service in a programmatic star configuration to create the local network, further wherein the network node service is configured to validate and authenticate local services provided by the plurality of clients or bots within the local network;

a source client or bot is configured to communicate data together with metadata to one or more destination clients or bots within the local network in real time or near real time, by relaying the data through the network node service; and the source client or bot is configured to encrypt information content of the data prior to communicating the data to the one or more destination clients or bots, wherein the source client or bot is configured to employ a key store to encrypt the information content of the data, the key store being stored in the source client or bot and the one or more destination clients or bots;

wherein the metadata comprises:

encryption information indicative of a unique identifier (ID) of the key store and a key index of a key material to be derived from the key store for subsequent decryption of the encrypted information content of the data, and group information indicative of the one or more destination clients or bots to which the data is to be communicated, wherein the source client or bot and the one or more destination clients or bots together form a group; and the data communication system is configured to register, with a registration service, services provided by the plurality of clients or bots.

2. The data communication system of claim 1, wherein the at least one network node comprises at least a first network node and a second network node, and wherein the plurality of network devices comprise a first set of network devices associated with the first network node, and a second set of network devices associated with the second network node, wherein:

the first network node is configured to provide a first network node service to a first set of clients or bots executing on the first set of network devices, and the second network node is configured to provide a second network node service to a second set of clients or bots executing on the second set of network devices, wherein individual clients or bots of the first set of clients or bots are communicably and only programmatically coupled around the first network node service in a programmatic star configuration to create a first local network, and individual clients or bots of the second set of clients or bots are communicably and only programmatically coupled around the second network node service in a programmatic star configuration to create a second local network, further wherein the first and second network node services are configured to validate and authenticate local services provided by the first and second sets of clients or bots within their respective local networks;

when a given source client or bot is configured to communicate data to a given destination client or bot within a same local network, the data to be communicated is relayed in real time or near real time through their associated network node service within the same local network; and when a given source client or bot is configured to communicate data to a given destination client or bot from a different local network, the data to be communicated is relayed in real time or near real time through a network node service associated with the given source client or bot and through a network node service associated with the given destination client or bot.

3. The data communication system of claim 1, wherein the metadata is communicated in an unencrypted form.

4. The data communication system of claim 1, wherein the metadata is communicated in an encrypted form.

5. The data communication system of claim 1, wherein the data communication system is configured to utilize one or more data communication networks existing in the local network for data communication.

6. The data communication system of claim 1, wherein the data communication system is configured to register, with the registration service, a given service provided by a given client or bot as a private service or a public service in respect of a user of the given client or bot.

7. The data communication system of claim 1, wherein a given local network is created in a dynamic manner.

8. A method of communicating data, via a data communication system for a local network, the data communication system comprising at least one network node and a plurality of network devices associated with the at least one network node, wherein the method comprises:

providing, via the at least one network node, a network node service to a plurality of clients or bots executing on the plurality of network devices, wherein individual clients or bots of the plurality of clients or bots are communicably and only programmatically coupled around the network node service in a programmatic star configuration to create the local network, further wherein the network node service is configured to validate and authenticate local services provided by the plurality of clients or bots within the local network;

communicating data together with metadata from a source client or bot to one or more destination clients or bots within the local network in real time or near real time, by relaying the data through the network node service; and encrypting, at the source client or bot, information content of the data prior to communicating the data to the one or more destination clients or bots, wherein a key store is employed to encrypt the information content of the data, the key store being stored in the source client or bot and the one or more destination clients or bots;

wherein the metadata comprises:
encryption information indicative of a unique identifier (ID) of the key store and a key index of a key material to be derived from the key store for subsequent decryption of the encrypted information content of the data, and group information indicative of the one or more destination clients or bots to which the data is to be communicated, wherein the source client or bot and the one or more destination clients or bots together form a group; and the method further comprises the data communication system registering, with a registration service, services provided by the plurality of clients or bots.

9. The method of claim 8, wherein the at least one network node comprises at least a first network node and a second network node, and the plurality of network devices comprise a first set of network devices associated with the first network node, and a second set of network devices associated with the second network node, wherein the method comprises:

providing, via the first network node, a first network node service to a first set of clients or bots executing on the first set of network devices, and providing, via the second network node, a second network node service to a second set of clients or bots executing on the second set of network devices, wherein individual clients or bots of the first set of clients or bots are communicably and only programmatically coupled around the first network node service in a programmatic star configuration to create a first local network, and individual clients or bots of the second set of clients or bots are communicably and only programmatically coupled around the second network node service in a programmatic star configuration to create a second local network, further wherein the first and second network node services are configured to validate and authenticate local services provided by the first and second sets of clients or bots within their respective local networks;

when a given source client or bot and a given destination client or bot are from within a same local network, relaying data to be communicated, in real time or near real time, through their associated network node service within the same local network; and when a given source client or bot and a given destination client or bot are from a different local network, relaying data to be communicated, in real time or near real time, through a network node service associated with the given source client or bot and through a network node service associated with the given destination client or bot.

10. The method of claim 9, wherein the method further comprises utilizing one or more data communication networks existing in the local network for data communication.

11. The method of claim 10, wherein the method further comprises registering, with the registration service, a given service provided by a given client or bot as a private service or a public service in respect of a user of the given client or bot.

12. The method of claim 8, wherein the metadata is communicated in an unencrypted form.

13. The method of claim 8, wherein the metadata is communicated in an encrypted form.

14. The method of claim 8, wherein the method further comprises creating a given local network in a dynamic manner.

15. A computer program product comprising a non-transitory computer-readable storage medium having computer-readable instructions stored thereon, the computer-readable instructions being executable by a computerized device comprising processing hardware configured to:

provide, via the at least one network node, a network node service to a plurality of clients or bots executing on the plurality of network devices, wherein individual clients or bots of the plurality of clients or bots are communicably and only programmatically coupled around the network node service in a programmatic star configuration to create the local network, further
wherein the network node service is configured to validate and authenticate local services provided
by the plurality of clients or bots within the local network;
communicate data together with metadata from a source client or bot to one or more
destination clients or bots within the local network in real time or near real time, by relaying the
data through the network node service; and
encrypt, at the source client or bot, information content of the data prior to communicating
the data to the one or more destination clients or bots, wherein a key store is employed to encrypt the information content of the data, the key store being stored in the source client or bot and the
one or more destination clients or bots;
wherein the metadata comprises:
encryption information indicative of a unique identifier (ID) of the key store and a key
index of a key material to be derived from the key store for subsequent decryption of the encrypted
information content of the data, and
group information indicative of the one or more destination clients or bots to which the
data is to be communicated, wherein the source client or bot and the one or more destination clients
or bots together form a group; and wherein
the processing hardware is further configured to cause the computerized device to register, with a registration service, services provided by the plurality of clients or bots.

* * * * *